United States Patent [19]

Hansen

[11] 4,209,816
[45] Jun. 24, 1980

[54] PROTECTIVE CONTROL FOR VEHICLE STARTER AND ELECTRICAL SYSTEMS

[75] Inventor: James E. Hansen, Oak Creek, Wis.
[73] Assignee: Eaton Corporation, Cleveland, Ohio
[21] Appl. No.: 922,725
[22] Filed: Jul. 7, 1978
[51] Int. Cl.² .......................... H02H 7/18; H02H 3/14
[52] U.S. Cl. ........................................ 361/23; 361/241;
    290/37 A; 123/179 BG; 290/38 R; 123/102;
    307/10 BP
[58] Field of Search ........................ 361/1, 23, 28, 239,
    361/240, 241, 236; 123/179 BG, 179 A, 102;
    290/37 R, 37 A, 38 R, 38 D; 307/10 R, 10 BP

[56] References Cited
U.S. PATENT DOCUMENTS

| | | | |
|---|---|---|---|
| 2,668,247 | 2/1954 | Short et al. | 290/37 A |
| 3,365,614 | 1/1968 | Lvongo et al. | 361/239 |
| 3,440,433 | 4/1969 | Coman | 361/241 X |
| 3,577,001 | 5/1971 | Cummins | 290/38 R |
| 3,857,043 | 12/1974 | Habasch | 123/179 BG |
| 3,893,007 | 7/1975 | Mori | 361/1 |

*Primary Examiner*—Patrick R. Salce
*Attorney, Agent, or Firm*—Hugh R. Rather; William A. Autio

[57] ABSTRACT

A protective control for the starter and electrical systems of a motor vehicle, including a main relay for controlling the electrical system, and a starter relay for controlling the starter system. Electronic logic is provided for the electrical system which: (1) prevents energization of the main relay if the battery polarity is reversed; (2) if the battery polarity is correct, turns on the main relay when a master switch is closed; and (3) maintains the main relay in an ON condition when an AC signal from the alternator is sensed even if the masterswitch is subsequently opened. The latter prevents disconnection of the battery from the electrical system while the engine is running. Electronic logic is also provided for the starter relay which: (1) after the main relay is closed, turns on the starter relay when a starter switch is closed, to thus permit cranking of the engine; (2) automatically deenergizes the starter relay when the AC signal from the alternator attains a designated threshold frequency, which corresponds to a pre-determined engine RPM at which it is desired to disengage the starter; and (3) has a hysteresis network to prevent subsequent re-energization of the starter relay until the AC signal from the alternator drops to a value substantially below the original threshold frequency, preferably when the engine is stopped or almost stopped, whereby the starter switch will re-energize the starter relay only if the master switch is closed and the engine is not running.

15 Claims, 2 Drawing Figures

PROTECTIVE CONTROL FOR VEHICLE STARTER AND ELECTRICAL SYSTEMS

BACKGROUND OF THE INVENTION

Protective systems for starter mechanisms in motor vehicles are known in the art. Protection is desirable in order to prevent damage which may otherwise occur if the starter is overrun, or re-energized after the engine is running. Starter protector or lock-out systems typically sense some function of engine RPM during the starter sequence and automatically remove electrical power to the starter motor when the engine attains an adequate RPM level to be running. Starter disconnect circuits are known which respond to intake manifold vacuum, oil pressure, frequency of an AC generator voltage, etc., to disable the starter at a predetermined engine RPM.

Starter control systems are also known in which after starter lock-out, the relay is maintained open until the engine speed falls to practically zero. Other starter protectors are known which require manual intervention for restart. Mechanically sequenced starter switches are also known.

SUMMARY OF THE INVENTION

The present invention relates to an improved starter protector, and also to the combination thereof with a control for the vehicle electrical system.

An object of the invention is to provide an improved protective control for vehicle starter systems which senses alternator frequency as a measure of engine RPM and automatically de-energizes the starter relay above a given threshold frequency and in which such frequency selective circuit includes a hysteresis network also responsive to alternator frequency to prevent subsequent re-energization of the starter until a reduced engine RPM.

Another object of the invention is to provide a starter protector of the aforementioned character in combination with an electrical system control having a master switch for connecting the vehicle battery to the starter system and to the electrical system, and having signal detection means also responsive to the alternator to prevent disconnection of the battery while the engine is running even if the master switch is subsequently opened.

Another object of the invention is to provide a protective control of the aforementioned character which is a compact module easily added to existing starter and electrical systems.

Another object of the invention is to provide a protective control of the aforementioned character having a frequency selective circuit responsive to alternator frequency for not only locking-out the starter at a selected threshold frequency but also including a hysteresis network for preventing re-energization of the starter above a lower selected frequency.

Another object is to provide a protective control of the aforementioned character wherein both the threshold and the lower selected frequencies are adjustable.

Another object of the invention is to provide a protective control of the aforementioned character exhibiting excellent thermal stability of the threshold frequency lockout set point.

Another object of the invention is to provide a protective control of the aforementioned character having a substantially widened range of frequency hysteresis.

Another object of the invention is to provide a protective control of the immediately aforementioned character utilizing an integrated circuit for threshold frequency selection.

Another object of the invention is to provide a protective control of the immediately aforementioned character having an add-on hysteresis network affording a wider range of hysteresis, and thus a substantially lower reset frequency point, than available solely from a resistor connection between a designated two of the integrated circuit's pins.

Another object of the invention is to provide a protective control of the aforementioned character having a voltage regulation circuit for assuring a stable supply voltage to the remainder of the protective control.

Another object of the invention is to provide a protective control of the aforementioned character having an input waveshaping circuit to compensate for the poor waveform shape, variable amplitude, and associated electrical extraneous noise in the AC voltage signal from the alternator.

Another object of the invention is to provide a protective control of the aforementioned character affording reverse polarity battery protection.

Other objects and advantageous will hereinafter appear.

DESCRIPTION OF THE PREFERRED EMBODIMENT

A general functional description will be given first referring to FIG. 1, followed by a detailed description referring to FIG. 2.

Figure 1:
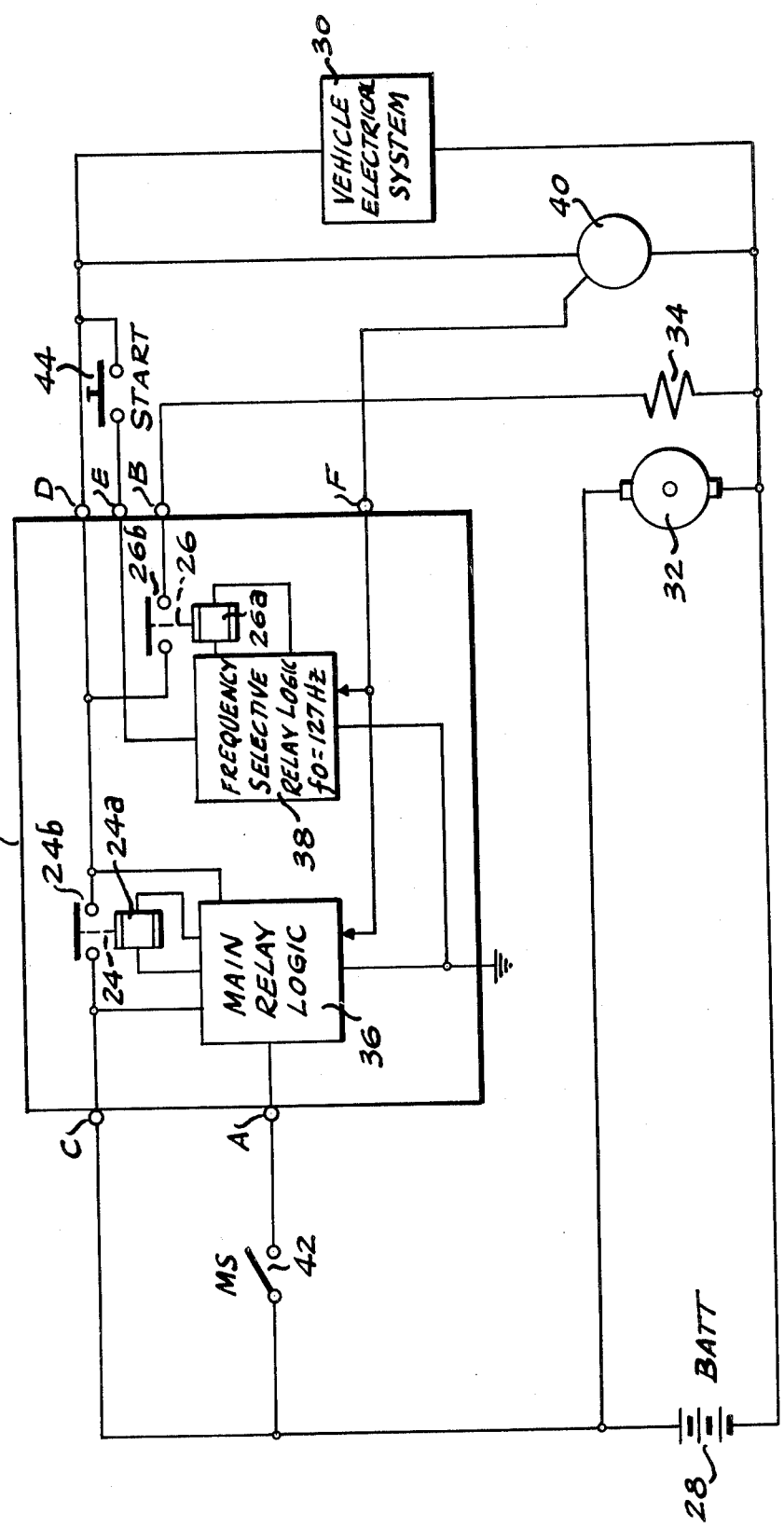
FIG. 1 is a block circuit diagram illustrating a protective control module according to the present invention and showing its application.

There is shown in FIG. 1 a protective control module outlined by a box 22, for use in a motor vehicle. The module includes a main relay 24 and a starter relay 26. The main relay is used to connect the vehicle battery 28 to the vehicle electrical system, generally designated 30. The starter relay is used to control the engine starter motor 32, and is connected to the starter solenoid 34.

The main relay and the starter relay are each controlled by respective electronic logic circuits 36 and 38 which are responsive to the AC voltage output signal of alternator 40. The alternator is driven by the engine, and thus the presence of an output signal from the alternator indicates that the engine is running, and the frequency of the AC voltage signal is a function of engine RPM.

Logic circuit 36 permits energization of main relay 24 when master switch 42 is manually closed by the driver, enabling current to flow to coil 24a which then pulls in armature 24b downwardly to complete a circuit from battery 28 to electrical system 30. Logic circuit 36 includes signal detection means, to be more fully described hereinafter, which senses the presence of a signal from alternator 40 and will hold the main relay closed even if the master switch is subsequently opened. This prevents disconnection of battery 28 from electrical system 30 while the engine is running. When no alternator signal is present, master switch 42 can open as well as close main relay 24.

Logic circuit 38 permits energization of starter relay 26 when main relay 24 is closed and starter switch 44 is manually closed by the driver, enabling current to flow to coil 26a which then pulls in armature 26b downwardly to complete a circuit from battery 30 through main relay 24 through starter relay 26 to starting motor solenoid 34, and hence enabling cranking of the engine by starting motor 32. Logic circuit 38 includes frequency selective means, to be more fully described hereinafter, which senses the frequency of the AC output signal from alternator 40 and responds to a predetermined set threshold cut-out frequency by automatically terminating current flow to coil 26a thus de-energizing starter relay 26 and breaking the circuit to solenoid 34, hence disengaging the starter. The set threshold cut-out frequency corresponds to a designated engine RPM beyond which the engine should not be cranked by starter motor 32. The frequency selective means of logic circuit 38 also includes hysteresis means which prevents subsequent re-energization of starter relay 26 until the AC signal frequency drops to a substantially lower reset cut-in frequency, preferably near zero, so that the engine cannot be cranked again until its RPM is low enough that the solenoid drive teeth, flywheel teeth, etc. will not be damaged.

Figure 2:
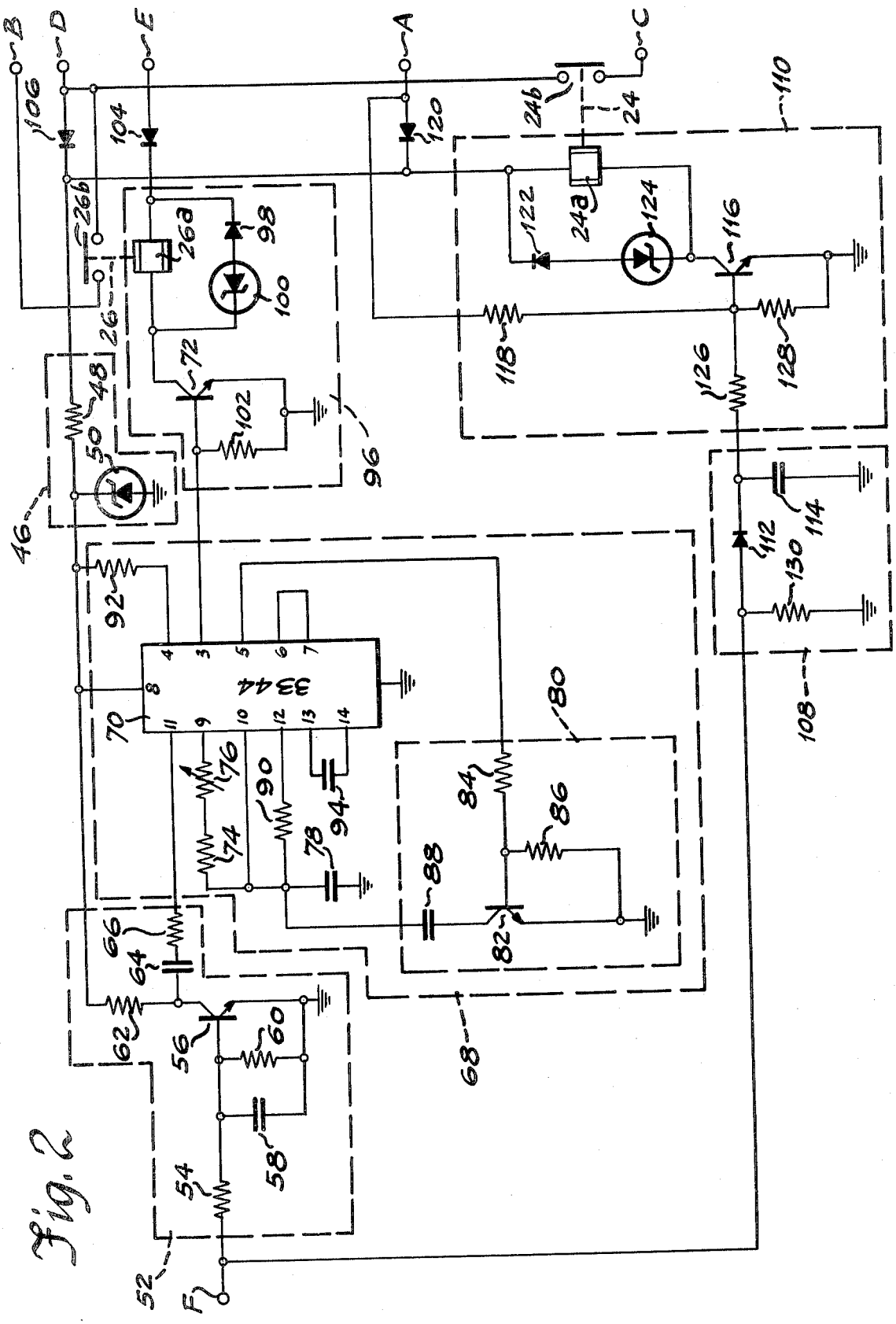
FIG. 2 is a circuit diagram of the protective control module of FIG. 1.

The above and other functions are accomplished by the embodiment shown in FIG. 2 which is a circuit diagram of module 22 of FIG. 1. The module has six connection points or terminals, identified A through F in FIG. 1. These connection points are correspondingly lettered in FIG. 2.

The particular module disclosed was specifically designed for use in military vehicles, though the invention is of course not limited thereto. The module is compact, measuring 7½ inches long by 3½ inches wide by 3½ inches high, and is an easy to install component. Terminal A is connected through master switch 42 to the positive side of battery 28. Terminal C is connected to the positive side of battery 28. Terminal D is connected to alternator 40 and to the vehicle electrical system, 30 in FIG. 1. Starter switch 44 is connected between terminals D and E. Terminal B is connected to starting motor solenoid 34. Terminal F is connected to the alternator to sense the AC output signal thereof; this AC signal is typically available as a special tap internal to the alternator on the AC side of the rectifier diodes.

The circuitry within module 22 will now be described in detail with reference to FIG. 2.

Dashed box 46 outlines a voltage regulation circuit comprising the combination of dropping resistor 48 and zener diode 50 used in the particular disclosed embodiment to drop the military vehicle 24 volt DC power down to a regulated 12 volt DC level supply for the precision frequency selective circuitry, to be described hereinafter.

Dashed box 52 outlines an input waveshaping circuit. The AC signal supplied by the alternator does not have a clean waveshape, and it varies in magnitude, particularly during the starting interval with which the present invention is concerned. A resistor 54 limits current to the base of an NPN transistor 56 and also forms an RC noise filter with a capacitor 58 connected across the base and emitter of transistor 56. The alternator signal is fed via terminal F through this network to the base of transistor 56 which is switched on and off by the signal. The collector of transistor 56 switches on and off (low and high) on the leading and trailing edges of the signal to the base, providing a pulse shaped signal of constant amplitude which is more suitable to be fed to the frequency selective circuitry, to be described hereinafter. Resistor 60 is connected in parallel with capacitor 58 across the transistor base-emitter to provide a base to emitter return path to aid turn-off. Resistor 62 is a collector load, or pull-up, resistor and is connected between the transistor collector and voltage regulation circuit 46. Capacitor 64 and resistor 66 provide coupling from the transistor collector signal to the frequency selective circuit.

Dashed box 68 outlines a frequency selective circuit. This circuit includes 3344 type integrated circuit, designated by the reference character 70. The same pin designations assigned to a 3344 type integrated circuit are used in FIG. 2 to facilitate clarity of the description to follow. The other components in frequency selective circuit 68 will be identified in the continuing description.

The pulse waveform from the collector of transistor 56 is fed to input pin 11 of component 70, and an output DC signal is derived at pin 3. Pin 3 is high or ON as long as the incoming frequency at pin 11 is below a predetermined set point or threshold frequency, which in this particular embodiment is 127 Hz. As the engine is started and its RPM's increase to a running or idling level, the frequency of the sensed alternator signal reaches 127 Hz at which point pin 3 now goes low or OFF, removing bias to the base of transistor 72 which in turn causes disengagement of starter relay 26, to be more fully described hereinafter. The frequency of the switch point is determined by the values of resistors 74 and 76 and capacitor 78. A stable metal glaze resistor is used for 74 and a polycarbonate capacitor for 78 to provide excellent frequency stability for the cut-out switch point of 127 Hz. This switch point remained within ±2 Hz over the temperature range −65° F. to +250° F. Component 70 itself is very stable but is at the mercy of the external threshold frequency determining elements.

A frequency hysteresis network, outlined in dashed box 80, is added in frequency selective circuit 68 such that once the trip out frequency at pin 11 has been attained or exceeded, the input frequency at pin 11 must now drop down substantially below said threshold trip out frequency before the starter relay can be re-energized (by pin 3 going back high), thus assuring starter lockout until the engine is essentially stopped. The hysteresis drops the reset frequency to below 10 Hz in this particular embodiment. This is accomplished by transistor 82 in conjunction with resistors 84 and 86 and capacitor 88, and a switching signal from pin 5 of component 70. When the frequency of the input signal to pin 11 is below the threshold trip frequency, 127 Hz, pin 5 is low or OFF, but when the input signal on pin 11 reaches 127 Hz, pin 5 switches high (the opposite or complement of output pin 3). When pin 5 toggles high, the base of transistor 82 is biased on through resistor 84. The collector of transistor 82 goes low, effectively grounding one side of capacitor 88, whereby the latter now is in effect in parallel with capacitor 78. (When the collector of transistor 82 is high, capacitor 88 is merely floated.) The addition of capacitor 88 in the frequency determining network of component 70 drops the switching frequency down to below 10 Hz. Once below this reset point, the threshold trip frequency will again recover to 127 Hz, allowing a normal restart of the engine. It is thus seen that when the input frequency at pin 11 reaches 127 Hz, pin 3 toggles low to disengage the starter and pin 5 toggles high to drop the reset frequency down to below 10 Hz. Pin 3 remains low until the input frequency at pin 11 decreases to less than 10 Hz, at which point pin 3 toggles back high (pin 5 goes low) to thus bias on transistor 72 whereby starter relay 26 may be re-energized and the engine cranked again.

A type 3344 integrated circuit, component 70, has provisions for obtaining hysteresis of input frequency by merely adding a resistor 90 between pins 10 and 12, but the range between initial and reset frequency set points, without adversely affecting circuit operation, was not as wide as preferred. Thus the hysteresis network 80 with transistor 82 switching in capacitor 88 was added, and was very effective. Since the low, or reset, frequency point is not critical compared to the initial threshold set frequency point, the requirements for capacitor 88 stability are not as great as for capacitor 78.

Other components in frequency selective circuit 68 include resistor 92 which limits the output current from pin 3 to the base of transistor 72, and capacitor 94 which is part of an additional integrator network used in the operation of integrated circuit 70.

Dashed box 96 outlines a starter relay drive circuit. The output switching signal from pin 3 of component 70 is supplied to the base of a darlington power transistor 72 which functions as an amplifier switch for starter relay coil 26a. When starter switch 44, FIG. 1, is closed, 24 volts DC is supplied to terminal E, FIG. 2, and starter relay 26 will be energized, whereby the engine is cranked. When the engine attains a predetermined RPM level, as indicated by the alternator supplying 127 Hz to the circuit at terminal F, the starter relay will be de-energized by transistor 72 turning off in response to pin 3 going low. The starter relay 26 will remain de-energized, even if starter switch 44 is held closed or re-closed, until the alternator signal drops below 10 Hz, whereby the engine cannot be cranked again until it has essentially stopped.

Other components in starter relay drive circuit 96 include diode 98 and zener diode 100 which form a transient suppressor to prevent relay coil 26a from developing high reverse voltages or back emf during turn off switching. Resistor 102 is a base to emitter return resistor to aid in the turn-off of transistor 72. Diode 104 provides reverse polarity protection to starter relay drive circuit 96. Diode 104 actually is redundant because additional reverse polarity protection is provided (by diode 120) in the main relay 24 switching circuit which, if not closed, will not permit power to be applied to starter switch 44, to be more fully described hereinafter.

Dashed box 108 outlines a signal detector circuit, and dashed box 110 outlines a main relay driver circuit. These circuits provide the interlock action that prevents opening or de-energizing of main relay 24, which connects the battery to the electrical system, while the engine is running.

Signal detector circuit 108 rectifies and filters the AC alternator signal, supplied to terminal F, through diode 112 and capacitor 114 and forms a DC voltage to bias ON darlington power transistor 116. Normally, when the engine is not running, master switch 42 will supply battery power to terminal A and will thus energize main relay 24 by supplying bias to the base of transistor 116 through resistor 118, and supplying coil bias through diode 120. Conduction of transistor 116 completes a circuit from terminal A through main relay coil 24a through transistor 116 to ground, whereby master switch 42 can thus turn main relay 24 on and off. However, once the engine is running and the alternator signal correspondingly supplied to signal detector circuit 108, transistor 116 will be biased ON even if master switch 42 is opened; in such case, coil 24a bias is supplied from terminal D through diode 106. Consequently, main relay 24 will remain closed until the alternator signal ceases, i.e. the engine stops. In the particular application of the preferred embodiment, the engine is not supposed to be stopped by the master switch, but by a fuel shut-off valve commonly used in diesel engined vehicles.

Diode 120 is the primary reverse polarity protection in the system. If the battery is connected in reverse, the electrical system cannot be connected because main relay 24 cannot be initially closed.

Diode 122 and zener diode 124 provide coil suppression for the main relay. Resistor 126 limits current from the detector circuit 108 to the base of transistor 116. Resistor 128 is a base to emitter return resistor to aid in turning off transistor 116. Resistor 130 is used to lower the input impedance of the circuit at point F.

OPERATION

A typical operational sequence will now be described.

The vehicle operator first closes master switch 42, FIG. 1, thus supplying battery power to terminal A. If the battery polarity is correct, main relay 24 will close due to the bias to coil 24a through diode 120 and transistor 116, FIG. 2. If the battery polarity is reversed, main relay 24 will not close because diode 120 is then blocking and prevents application of power to coil 24a; no circuit damage occurs because the electrical system cannot be connected, nor can starter relay 26 be energized.

With correct battery polarity and main relay 24 closed, battery 28 is tied into the vehicle electrical system by armature 24b closing the contacts between terminals C and D, FIG. 1. At this time master switch 42 has full control of main relay 24 and can open the latter if desired.

With the electrical system now energized, the operator can start the engine by closing starter switch 44, FIG. 1, supplying power from terminal D to terminal E. Starter relay 26 will now be energized because transistor 72, FIG. 2, is biased ON by a signal from output pin 3 of component 70 which in turn has sensed at input pin 11 that no signal yet exists from the alternator at terminal F. The engine will now be cranked by starter motor 32, FIG. 1, because of the energization of solenoid 34 enabled by the completed circuit therethrough from closed starter relay 26.

As the engine begins to pick up speed, its RPM level increases such that alternator 40, FIG. 1, will generate a signal at its AC internal tap, which AC signal is fed to terminal F on control module 22. The AC signal frequency is proportional to engine RPM, and when the frequency reaches a predetermined set point value, here 127 Hz, frequency selective circuit 38 in FIG. 1, 68 in FIG. 2, ceases bias to starter relay drive circuit 96, thus dropping out or opening starter relay 26 (unless of course the starter relay has already been opened by the operator's opening of starter switch 44). The starter function is now locked out and starter switch 44 is ineffective until the alternator's AC signal frequency is very low due to the hysteresis provided in frequency selective circuit 68 by frequency hysteresis network 80, FIG. 2, after trip out. The low level reset point in this case is 10 Hz, whereby the engine must be essentially stopped before it can be re-cranked.

While the engine is running and the alternator signal is supplied to terminal F of the module, the master switch 42 can be opened but the main relay 24 will remain closed due to the signal detector circuit 108, FIG. 2, maintaining bias on main relay driver circuit 110. Main relay 24 can only be opened when the engine RPM is very low such that the alternator signal ceases.

It is recognized that variations and modifications are possible within the scope of the appended claims.

I claim:

1. A protective control for the starter system of an engine which is cranked by a starter motor, comprising:
    starter relay means in circuit with said starter motor;
    frequency selective means responsive to engine RPM to automatically open said starter relay means above a predetermined threshold set frequency corresponding to a designated RPM level, to prevent cranking of said engine thereabove,
    said frequency selective means including hysteresis means to prevent reclosing of said starter relay means until engine RPM drops to a lower level corresponding to a reset frequency less than said threshold set frequency, whereby to prevent re-cranking of said engine until engine RPM drops to said lower level;
    transducer means responsive to engine speed to produce a signal whose frequency corresponds to engine RPM,
    said frequency selective means having an input for receiving said transducer signal and an output controlling said starter relay means;
    wherein said transducer signal, upon reaching said threshold set frequency, causes said output to switch states and also activates said hysteresis means to lower the frequency value necessary to cause switching of said output back to its original state;
    said transducer means comprising an AC signal generator and input waveshaping means for receiving the AC signal and delivering a clear waveshape signal to said input of said frequency selective means;
    said frequency selective means comprising a programmable frequency switch having an input receiving said transducer signal and a pair of opposite state outputs one of which is connected to said starter relay means and the other of which is connected to a hysteresis network, such that when the frequency of said transducer signal at said input reaches said threshold value, said outputs switch states such that said one output causes opening of said starter relay means and said other output causes said hysteresis network to lower the value of said threshold frequency down to said reset frequency;
    said hysteresis network comprising a capacitor which is floated when the other of said outputs is in the first mentioned of its states, and which is connected in circuit with said frequency switch when said other of said outputs switches to its second mentioned state.

2. The invention according to claim 1 wherein said hysteresis network comprises a transistor which is biased into conduction by said second state of said other output to complete said circuit through said capacitor.

3. The invention according to claim 1 wherein said frequency selective means comprises a second capacitor connected to another input of said frequency switch for selecting the value of said threshold set frequency, said first capacitor being connected in parallel with said second capacitor when said other output is in said second state, said parallel combination of said capacitors determining the value of said reset frequency.

4. The invention according to claim 1 wherein said transducer comprises an alternator driven by said engine, and wherein said input waveshaping means comprises a transistor biased by the AC alternator signal to abruptly switch ON and OFF on leading and trailing edges of said AC signal, one of the emitter and collector of said transistor thus switching low and high and connected to said input of said frequency selective means for delivering a clean pulse shape signal thereto.

5. A protective control for the starting and electrical systems of a vehicle having an engine which is cranked by a starter motor and battery, comprising:
    a main relay between said battery and said electrical system:
    a starter relay between said main relay and said starter motor;
    a master switch in circuit with said main relay;
    a starter switch in circuit with said starter relay;
    electronic logic for said main relay which:
        (a) permits energization of said main relay when said master switch is closed; and
        (b) senses engine RPM and will maintain said main relay closed even if said master switch is subsequently opened, whereby to prevent disconnection of said battery from said electrical system when said engine is running;
    electronic logic for said starter relay which:
        (a) after said main relay is closed, permits energization of said starter relay when said starter switch is closed, to thus enable energization of said starter motor and cranking of said engine;
        (b) senses engine RPM and automatically de-energizes said starter relay at a predetermined set threshold engine RPM level to thus disengage said starter motor; and
        (c) prevents subsequent re-energization of said starter relay and hence said starter motor until engine RPM drops to a reset level lower than said predetermined set threshold level;
    transducer means responsive to engine speed to produce a signal whose frequency corresponds to engine RPM,
    said electronic logic for said starter relay comprising frequency selective means having an input for receiving said transducer signal and an output controlling said starter relay;
    said frequency selective means including hysteresis means such that said transducer signal upon reaching a predetermined set threshold frequency corresponding to said set threshold engine RPM level causes said output to switch states to de-energize said starter relay and also activates said hysteresis means to lower the input frequency necessary to switch said output back to its original state down to a reset frequency value less than said set threshold frequency and corresponding to said reset lower level engine RPM, said electronic logic for said main relay responding to the same said transducer signal for sensing engine RPM.

6. The invention according to claim 5 wherein said transducer comprises an AC signal generator, said invention further comprising input waveshaping means for receiving the AC signal and delivering a clean waveshape signal to said input of said frequency selective means.

7. The invention according to claim 6 wherein said transducer comprises an alternator driven by said engine, and wherein said input waveshaping means comprises a transistor biased by the AC alternator signal to abruptly switch ON and OFF on leading and trailing edges of said AC signal, one of the emitter and collector of said transistor thus switching low and high and connected to said input of said frequency selective means for delivering a clean pulse shape signal thereto.

8. The invention according to claim 5 wherein said frequency selective means comprises a programmable frequency switch having an input receiving said transducer signal and a pair of opposite state outputs one of which is connected to said starter relay the other of which is connected to a hysteresis network, such that when the frequency of said transducer signal at said input reaches said set threshold value, said outputs switch states such that said one output causes opening of said starter relay and said other output causes said hysteresis network to lower the value of said threshold frequency down to said reset frequency.

9. The invention according to claim 8 wherein said hysteresis network comprises a capacitor which is floated when the other of said outputs is in the first mentioned of its states, and which is connected in circuit with said frequency switch when said other of said outputs switches to its second mentioned state.

10. The invention according to claim 9 wherein said hysteresis network comprises a transistor which is biased into conduction by said second state of said other output to complete said circuit through said capacitor.

11. The invention according to claim 9 wherein said frequency selective means comprises a second capacitor connected to another input of said frequency switch for selecting the value of said threshold set frequency, said first capacitor being connected in parallel with said second capacitor when said other output is in said second state, said parallel combination of said capacitors determining the value of said reset frequency.

12. The invention according to claim 8 wherein said one output is high until the frequency of said transducer signal reaches said threshold set frequency whereafter said one output switches low and remains low until the frequency of said transducer signal drops below said reset frequency due to said hysteresis network, and further comprising a transistor in circuit with said starter relay and biased into conduction by said one output when in said high state to enable completion of a circuit through said starter relay whereby the latter may be closed to permit energization of said starter motor and cranking of said engine.

13. The invention according to claim 5 wherein said electronic logic for said main relay comprises signal detection means for detecting the presence of a signal from said transducer and for delivering said signal to a transistor in circuit with said main relay to bias said transistor into conduction to enable completion of a circuit through said main relay.

14. The invention according to claim 13 wherein closure of said master switch connects said battery to the base of said transistor to thus bias said transistor into conduction and hence energize said main relay.

15. The invention according to claim 5 wherein said control is a pre-assembled module which may be added to the existing circuitry of a vehicle having an alternator driven by the vehicle's engine:

said module having a first terminal connectable to said battery through said master switch, said first terminal being connected internally of said module to said electronic logic for said main relay, said module having a second terminal connectable to said starter motor, said second terminal being connected internally of said module to one side of said starter relay, said module having a third terminal connectable to said battery in parallel with the series combination of said master switch and said first terminal, said third terminal being connected internally of said module to one side of said main relay, said module having a fourth terminal connectable to said electrical system, said fourth terminal being connected internally of said module to the other side of said main relay, said module having a fifth terminal connectable to said fourth terminal through said starter switch, said fifth terminal being connected internally of said module to said electronic logic for said starter relay, said module having a sixth terminal connectable to said alternator for feeding to said module an AC signal having a frequency corresponding to engine RPM, said sixth terminal being connected internally of said module to said electronic logic for said starter relay and to said electronic logic for said main relay.

* * * * *